United States Patent
Sakakibara et al.

[11] Patent Number: 5,938,997
[45] Date of Patent: Aug. 17, 1999

[54] MOLDED SURFACE FASTENER AND METHOD FOR MANUFACTURING THE SAME

[75] Inventors: Keisuke Sakakibara; Ryuichi Murasaki; Shinichi Daijyogo; Tsuyoshi Minato, all of Toyama-ken, Japan

[73] Assignee: YKK Corporation, Tokyo, Japan

[21] Appl. No.: 08/896,686

[22] Filed: Jul. 18, 1997

Related U.S. Application Data

[62] Division of application No. 08/656,046, May 31, 1996, Pat. No. 5,702,797.

[30] Foreign Application Priority Data

Jun. 2, 1995 [JP] Japan ................................. 7-136682

[51] Int. Cl.⁶ .................................................. B29C 45/04
[52] U.S. Cl. ............... 264/167; 264/171.11; 264/171.13; 264/173.1
[58] Field of Search ..................................... 264/167, 243, 264/171.11, 171.13, 173.1; 428/100; 156/244.15

[56] References Cited

U.S. PATENT DOCUMENTS

| | | |
|---|---|---|
| 3,057,539 | 10/1962 | Leary, Jr. . |
| 3,168,605 | 2/1965 | Ellegast et al. . |
| 4,117,609 | 10/1978 | Helt . |
| 4,769,202 | 9/1988 | Eroskey et al. . |
| 5,260,015 | 11/1993 | Kennedy et al. . |
| 5,436,051 | 7/1995 | Donaruma et al. . |
| 5,441,687 | 8/1995 | Murasaki et al. . |
| 5,512,234 | 4/1996 | Takizawa et al. . |
| 5,620,769 | 4/1997 | Wessels et al. . |
| 5,669,120 | 9/1997 | Wessels et al. . |
| 5,690,875 | 11/1997 | Sakakibara et al. . |
| 5,702,797 | 12/1997 | Sakakibara et al. . |

FOREIGN PATENT DOCUMENTS

| | | |
|---|---|---|
| 0661 008-A2 | 7/1995 | European Pat. Off. . |
| 0661 008-A3 | 7/1995 | European Pat. Off. . |
| 7-79812 | 3/1995 | Japan . |

*Primary Examiner*—Jan H. Silbaugh
*Assistant Examiner*—Mark Eashoo
*Attorney, Agent, or Firm*—Hill & Simpson

[57] ABSTRACT

Molten resin is continuously extruded from an injection die or an extrusion die toward the circumferential surface of a die wheel having in its circumferential surface a multiplicity of hook-element-forming cavities and, at the same time, one or more yarns are introduced between the molten resin and the circumferential surface of the die wheel into an inter-element portion of a substrate sheet between a desired adjacent rows of hook elements in parallel to the hook element rows. The yarns are embedded in and integrally molded with the inter-element portion of the substrate sheet and at the same time, hook elements are molded on the circumferential surface of the die wheel as the hook-element-forming cavities are filled with part of the molten resin.

6 Claims, 5 Drawing Sheets

MOLDED SURFACE FASTENER AND METHOD FOR MANUFACTURING THE SAME

This is a division, of application Ser. No. 08/656,046, filed May 31, 1996, now U.S. Pat. No. 5,702,797.

BACKGROUND OF THE INVENTION

1. Field of the Invention

This invention relates to a molded surface fastener having a multiplicity of engaging elements formed on one surface of a substrate sheet by injection or extrusion using thermoplastic resin and a method of manufacturing the surface fastener. More particularly, the invention relates to a molded surface fastener in which a substrate sheet can be torn along and between a desired adjacent pair of rows of male engaging elements and a method of manufacturing the surface fastener.

2. Description of the Related Art

A conventional type surface fastener in which a substrate sheet and engaging elements to be formed on one surface of the substrate sheet are integrally molded by extrusion and in which a backing strip is attached to the substrate sheet during molding is disclosed in, for example, U.S. Pat. No. 5,260,015. According to this U.S. Patent, molten thermoplastic resin is extruded toward a predetermined gap between a drum-shape die wheel, which is composed of a plurality of mold disc and a plurality of spacer plates alternately placed one over another, and a press roller and, at the same time, the backing strip is introduced between the extruded resin and the press roller. As the backing strip is introduced, part of the resin is penetrated into the backing strip under the pressure by the press roller and at the same time, hook-element-forming cavities in the circumferential surface of the die wheel are filled with part of the resin to mold hook elements. The resulting surface fastener wits the backing strip integrally attached to a surface opposite-to the surface having the hook elements of the substrate sheet is cooled as it is moved around the circumferential surface of the die wheel through a predetermined angle along the rotation of the die wheel, whereupon the molded hook elements are pulled off the cavities as the substrate sheet is continuously removed from the circumferential surface of the die wheel.

In the meantime, the present inventors have made copending U.S. patent application, Ser. No. 08/359,895, on a continuous injection molding method for continuously manufacturing a surface fastener having yarns embedded in a substrate sheet. According to this U.S. patent application, molten resin is continuously injected from an injection die, which is disposed in confronting relationship with a die wheel with a predetermined gap therebetween having in the circumferential surface a multiplicity of engaging-element-forming cavities and having inside a cooling means, to the circumferential surface of the die wheel, by a predetermined width and at the same time, a plurality of yarns are continuously introduced in the direction of rotation of the die wheel circumferentially thereof so as to cross an outlet of the injected molten resin while one or more yarns are introduced as being traversed by a predetermined width in parallel to the axis of the die wheel. As the engaging-element-forming cavities are filled with part of the molten resin, the die wheel is driven to rotate simultaneously with injection of the molten resin to embed the yarns in the substrate sheet and at the same time, to integrally mold a multiplicity of engaging elements on the surface of substrate sheet. The molded and cooled surface fastener is moved about the circumferential surface of the die wheel through a predetermined angle along the rotation of the die wheel, whereupon the substrate sheet together with the engaging elements are positively pulled off the circumferential surface of the die wheel.

According to the method disclosed in U.S. Pat. No. 5,260,015, in order to overcome a difficulty that when a rear surface of the surface fastener of this conventional type is smooth, an adhesive agent or cement cannot be easily applied unless the surface is given some special treatment, an object is to make it easier to apply the adhesive agent or cement to the smooth back surface of the surface fastener by integrally attaching a backing strip or to form a multiplicity of piles as female engaging elements on the back surface of the substrate sheet using the backing strip.

On the other hand, according to the method disclosed in U.S. patent application, Ser. No. 08/359,895, the yarns are introduced in a meandering manner to the circumferential surface of the die wheel in order to reinforce the substrate sheet, and in the presence of added yarns traversed across the circumferential surface of the die wheel, the substrate sheet can be reinforced more.

In either of these two methods, from a manufacturing efficiency view point, a large-width surface fastener is molded and is then divided into desired-width surface fasteners by cutting, whereupon the small-width surface fasteners are delivered from the factory. On many occasions, however, such surface fastener has to be further divided into ones with narrower width at retailer shops, sewing factories, or other working cites. Consequently it has been inevitable to cut the large-width surface fastener along and between a desired pair of rows of male engaging elements into desired small-width surface fasteners by cutting means such as scissors. If the substrate sheet has a thickness exceeding 0.25 mm, this type molded surface fastener cannot be torn unless it is torn by a pulling force larger than 1 kg.

SUMMARY OF THE INVENTION

It is therefore an object of this invention to provide a surface fastener which is extrusion- or injection-molded by a simple mechanism without necessity of modifying the original design and which can be divided into smaller-width surface fasteners and between a desired adjacent pair of rows of male engaging elements simply and uniformly without using special cutting means.

The present inventors have discovered that if yarns are embedded in only a substrate of a molded surface fastener obtained by either the extrusion or injection molding method of this invention, the substrate sheet could be torn very simply along the yarn-embedded portions.

According to a first aspect of this invention, there is provided a molded surface fastener of synthetic resin comprising: a substrate sheet; a multiplicity of male engaging elements integrally standing in rows on one surface of the substrate sheet; and a number of yarns each embedded in part of the substrate sheet between an adjacent pair of rows of the male engaging elements and straightly extending parallel to the rows of the male engaging elements.

In the above described surface fastener, the yarns may be embedded centrally in the substrate sheet, but preferably, the yarns are disposed at a position toward the one surface of the substrate sheet on which the male engaging elements stand or at a position toward the other surface of the substrate sheet. If the part of the substrate sheet in which the yarns are embedded has a resin thickness smaller than 0.3 mm exclusive of the yarn, it is possible to tear the substrate sheet by a pulling force smaller than 1 kg. The size of the yarns is not limited to a specified size; even if the size of the yarns is larger than the thickness of the general substrate sheet, the yarns are flattened under external pressures, such as resin pressure and pressure of the press roller, in the substrate sheet during molding so that a resin film is necessarily formed either over or under the yarns. Therefore, the substrate sheet is not torn unless an external force in the separating direction is exerted on the substrate sheet during molding, and the molded shape of the substrate sheet is kept when the manufactured surface fasteners are to be delivered from the factory.

The thermoplastic resin to be used in the surface fastener of this invention is exemplified by polyamide resin, polyester resin, polypropylene resin and polyethylene resin, all of which are commonly used. The yarns may be affined or not affined with the resin and may be made of, for example, natural fibers, semi-synthetic resin fibers or synthetic resin. If semi-synthetic resin fiber yarns or synthetic resin yarns are used, they are preferably monofilaments or multifilaments.

This surface fastener is manufactured efficiently by the following two methods:

The first method is a method of manufacturing a synthetic resin surface fastener having a substrate sheet and a multiplicity of male engaging elements integrally molded on the substrate sheet, comprising the steps of: rotating in one direction a die wheel having in its circumferential surface a multiplicity of male-engaging-element-forming cavities in rows; continuously injecting a predetermined width of molten resin from an injection die under a predetermined injection pressure toward the circumferential surface of the die wheel; continuously introducing, during the injection, a plurality of yarns circumferentially of the die wheel between a desired adjacent pair of rows of the male-engaging-element-forming cavities on the circumferential surface of the die wheel at a part where the molten resin and the yarns are introduced onto the die wheel; integrally molding the substrate sheet with the yarns and, at the same time, molding the male engaging elements on the circumferential surface of the die wheel as the male-engaging-element-forming cavities are filled with part of the molten resin; positively cooling the circumferential surface of the die wheel; and continuously taking up the molded and cooled surface fastener from the circumferential surface of the die wheel.

The second method is a method of manufacturing a synthetic resin surface fastener having a substrate sheet and a multiplicity of male engaging elements integrally molded on the substrate sheet, comprising the steps of: rotating a die wheel, which has in its circumferential surface a multiplicity of engaging-element-forming cavities in rows, and a pressure roller, which is disposed in confronting relation with and is spaced a predetermined gap from the die wheel, synchronously in mutually opposite directions; continuously extruding molten resin from an extrusion die toward the gap between the die wheel and the pressure roller by a predetermined width; continuously introducing a plurality of yarns between the circumferential surface of the die wheel and the molten resin extruded from the extrusion die and between a desired adjacent pair of rows of the engaging-element-forming cavities in the circumferential surface of the die wheel; integrally molding, as the introduced molten resin is pressed by the pressure roller, the yarns with the substrate sheet on the circumferential surface of the die wheel and, at the same time, molding the male engaging elements on the circumferential surface of the die wheel as the male-engaging-element-forming cavities are filled with part of the molten resin; positively cooling the circumferential surface of the die wheel; and continuously taking up the molded and cooled surface fastener from the circumferential surface of the die wheel.

Preferably, in each of the first and second methods, the gap between the injection die and the die wheel or between the die wheel and the press roller is controlled in such a manner that the part of the substrate sheet in which the yarns are embedded has a resin thickness smaller than 0.3 mm exclusive of the yarn.

DETAILED DESCRIPTION OF THE PREFERRED EMBODIMENTS

Preferred embodiments of this invention will now be described in detail with reference to the accompanying drawings.

Figure 1:
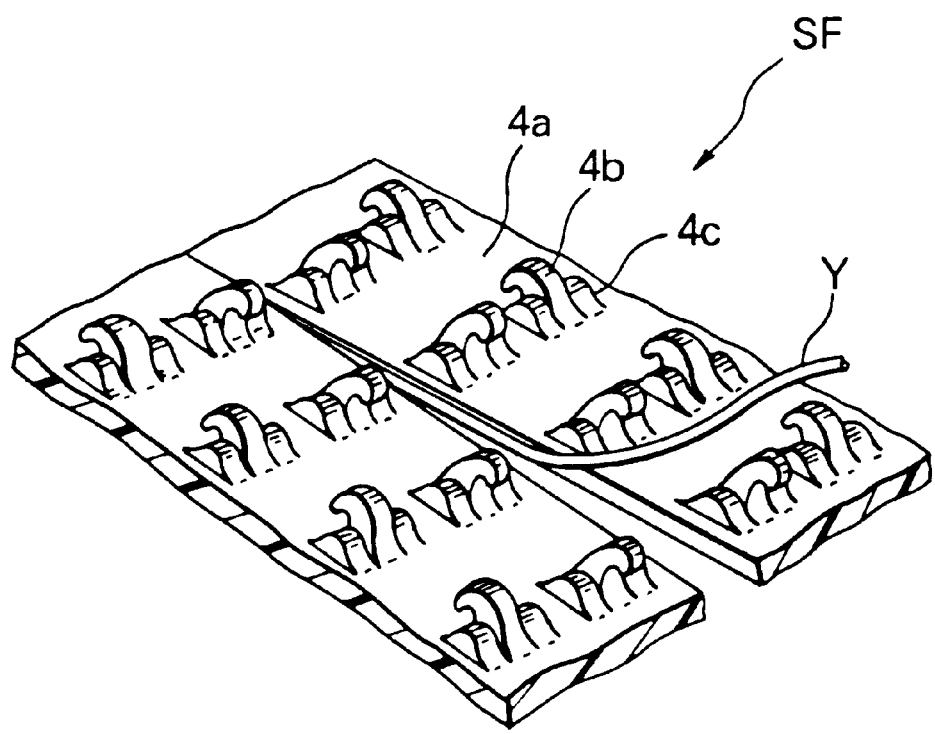
FIG. 1 is a fragmentary perspective view of a yarn-embedded molded surface fastener according to this invention, showing the surface fastener as torn along a yarn.

FIG. 1 is a fragmentary perspective view, with parts broken away, of a typical surface fastener according to this invention. As shown in FIG. 1, the surface fastener SF comprises a substrate sheet 4a, a multiplicity of male engaging elements 4b standing in rows on one surface of the substrate sheet 4a, and a number of yarns Y each embedded in the substrate sheet 4a straightly along and between an adjacent pair of rows of the male engaging elements 4b. In the embodiment, the substrate sheet 4a and the male engaging elements 4b are make of polyamide resin, while the yarns Y are twisted threads of polyester resin multifilaments.

The yarns Y used in this invention may be fiber yarns made of natural fibers, such as plant fibers, animal fibers or mineral fibers, or semi-synthetic fiber yarns made of such as polyacetate fibers, or monofilaments or multifilaments of thermoplastic synthetic resin. The thermoplastic synthetic resin of the surface fastener is exemplified by polyester resin, polyamide resin, polypropylene resin and polyethylene resin; the material of the surface fastener may be either identical with or different from that of the yarns.

In the surface fastener SF of this invention, the substrate sheet 4a in which the yarns Y are embedded can be torn along a desired yarn Y simply by pulling up one end of the yarn Y as shown in FIG. 1. The individual torn surfaces of each subdivided substrate sheet 4a are neat and uniform and hence require no further process.

Figure 6A:
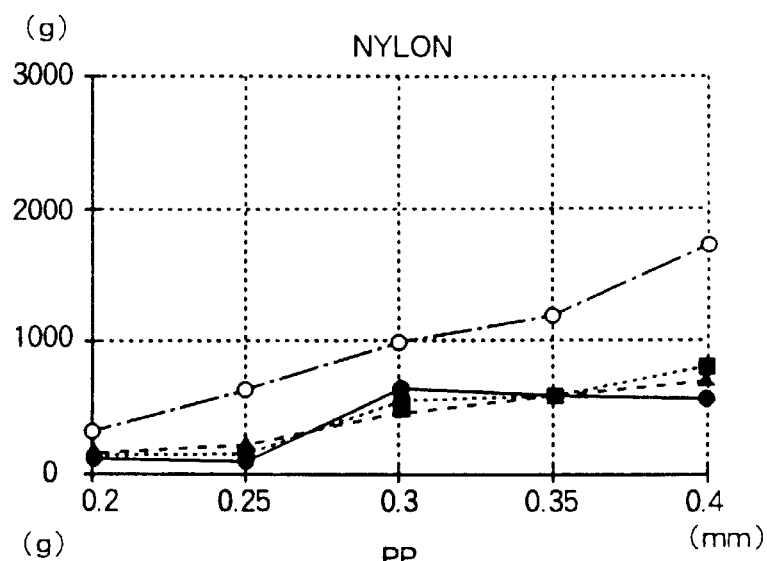
FIGS. 6(A), 6(B) and 6(C) are graphs each showing variation of tear strength of a substrate sheet with yarns embedded.
Figure 6B:
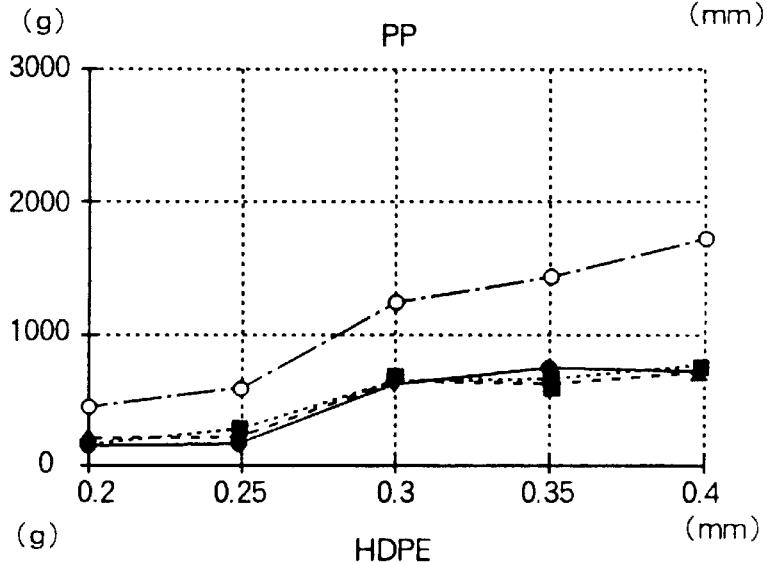
Figure 6C:
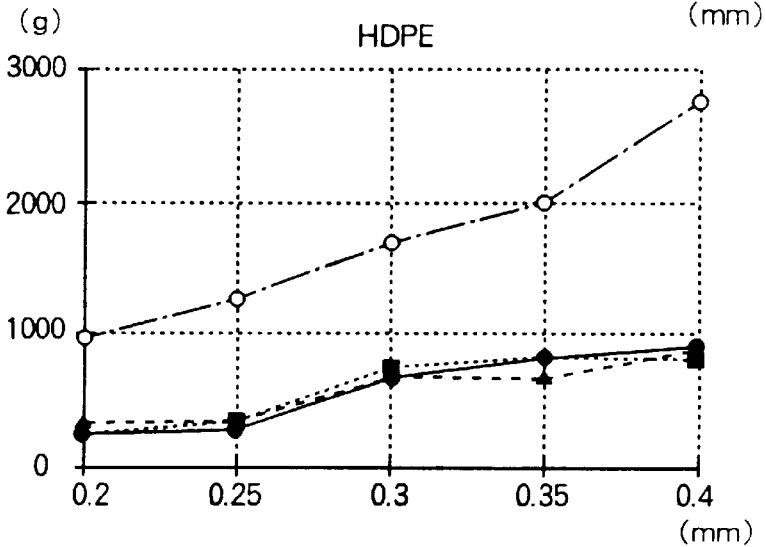

FIGS. 6(A), 6(B) and 6(C) are graphs showing the results of experiments conducted under the direction of the present inventors, with the horizontal axis representing variation of thickness (mm) of the substrate sheet 4a and with the vertical axis representing variation of tear strength (g) of the substrate sheet 4a. In these views, ○ stands for tear strength with respect to substrate-sheet thickness when no yarn Y is embedded in the substrate sheet 4a, ● stands for tear strength with respect to substrate-sheet thickness when the yarn Y of No. 20 (0.20 mm in diameter) was embedded in the substrate sheet 4a, ■ stands for tear strength with respect to substrate-sheet thickness when the yarn Y of No. 30 (0.18 mm in diameter) was embedded, and ▲ stands for tear strength with respect to substrate-sheet thickness when the yarn Y of No. 40 (0.14 mm in diameter) was embedded. FIG. 6(A) is a graph showing the result of one experiment in which the yarns Y were spun yarns of nylon fibers; FIG. 6(B) is a graph showing the result of another experiment in which the yarns Y were spun yarns of polypropylene fibers; and FIG. 6(C) is a graph showing the result of still another experiment in which the yarns Y were spun yarns of high-density polyethylene fibers.

It is understood from FIGS. 6(A), 6(B) and 6(C) that the substrate sheet 4a in which yarns Y are embedded were sharply reduced in tear strength as compared to the substrate sheet 4a having no yarn and also that the absolute value of the tear strength varied substantially uniformly, regardless of the material of the molded surface fastener. Further, the present inventors studied the relation between the size of the yarns Y and the thickness of the substrate sheet 4a and found that the tear strength was very low in a range of 100–150 g for the thickness of the substrate sheet 4a in a range of 0.20 to 0.25 mm but desired-width surface fasteners stable in shape could be continuously obtained without any difficulty during the molding described below.

As an additional study was made for the substrate-sheet thickness of 0.20 mm, it turned out that the yarn Y of No. 20 had a diameter equal to the thickness of the substrate sheet 4a. Regardless of this, it was a surprising fact that a tear strength of about 100 g was maintained as mentioned above. It was presumed that the yarns Y were flattened by a molding pressure (i.e. a resin pressure to be applied to a substrate-sheet-molding gap between an injection die and a die wheel during injection molding or an extrusion pressure to be applied between a die wheel and a press roller during extrusion molding) to be applied while the substrate sheet 4a was molded and that molten resin was fused like a film over upper and lower surfaces of the individual flattened yarn Y.

Figure 2:
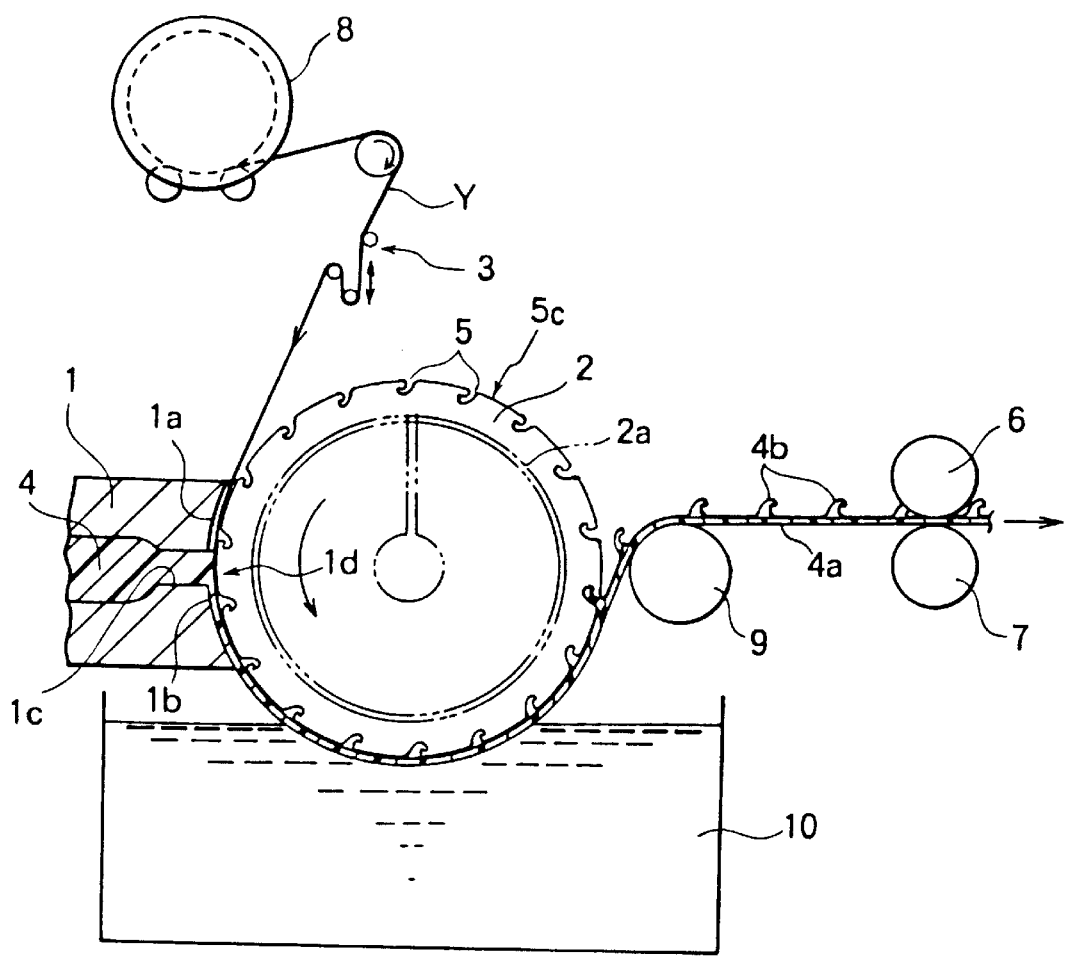
FIG. 2 is a fragmentary vertical cross-sectional view of an apparatus for manufacturing the yarn-embedded molded surface fastener of FIG. 1 by a method according to a first embodiment.

The surface fastener SF having the foregoing structure is manufactured very efficiently by a method according to this invention. FIG. 2 illustrates a typical embodiment of a method for continuously manufacturing the surface fastener SF by injection molding. In this embodiment, engaging elements to be molded on the substrate-sheet surface are hook elements.

In FIG. 2, reference numeral 1 designates an injection die; the upper half surface of a tip of the injection die 1 is an arcuate surface 1a having a curvature substantially equal to that of a die wheel 2 described below, while the lower half surface is an arcuate surface 1b having a curvature such that a predetermined gap is defined with respect to a curved circumferential surface of the die wheel 2. The injection die 1 is a T-shape die for continuously injecting molten resin 4 in the form of a sheet under a predetermined resin pressure from an injection nozzle 1d defined centrally between the upper and lower arcuate surfaces 1a, 1b. In this embodiment, the injection die 1 has a central molten resin sprue 1c. Alternatively the whole tip of the injection die 1 may have a single arcuate surface.

The circumferential surface of the die wheel 2 is disposed with a part thereof being adjacent to the upper arcuate surface 1a of the injection die 1 and is spaced a predetermined gap from the lower arcuate surface 1b, with its axis parallel to the injection nozzle 1d. In the illustrated example, the die wheel 2 has in its circumferential surface a multiplicity of hook-element-forming cavities 5 in rows. As the structure of the die wheel 2 is substantially identical with that disclosed in U.S. patent application Ser. No. 08/359,895, its construction is described briefly here. The die wheel 2 is in the form of a hollow drum having a water-cooling jacket 2a inside and composed of a multiplicity of ring-shape plates placed one over another about and along its axis, each of every other ring-shape plates having in opposite surfaces a multiplicity of hook-element-forming cavities 5 with their bases opening to the circumferential surface of the die wheel 2, each of the remaining ring-shape plates having in opposite surfaces a multiplicity of non-illustrated reinforcing-rib-forming cavities in rows. The die wheel 2 is driven by a non-illustrated well-known synchronous drive unit for rotation in a direction indicated by an arrow.

One or more yarns Y to be drawn parallel to one another from a desired number of bobbins are introduced into a gap between the upper arcuate surface 1a and the circumferential surface of the die wheel 2 via a tension regulator 3, after touching part of the circumferential surface of the die wheel 2. Further, in this embodiment, a cooling water tank 10 is disposed under the die wheel 2 in such a manner that a lower part of the die wheel 2 is soaked in the cooling water tank 10. A guide roller 9 is disposed diagonally upwardly on the downstream side of the cooling water tank 10, and further downstream of the guide roller 9, a vertical pair of take-up rollers 6, 7 rotatable in synchronism with the rotation of the die wheel 2 are disposed.

The position from which each yarn Y is to be introduced onto the die wheel 2 is a substrate-sheet-forming section 5c defined between a desired adjacent pair of cavity rows and disposed off the hook-element-forming cavities 5 and the reinforcing-rib-forming cavities, which are arranged in rows circumferentially and axially of the die wheel 2. Generally, at a circumferential position of the die wheel on a circumferential surface in accordance with a predetermined width of a surface fastener, a predetermined width of smooth surface devoid of cavities is provided for forming a hook-element-free margin so that the yarn is to be introduced circumferentially around the smooth surface.

Assuming that the yarns Y are to be embedded in the substrate sheet 4a at a thickwise off-center position toward the front surface, i.e. the hook-element-molded surface, they should be introduced on and along the circumferential surface of the die wheel 2 before being introduced into the gap between the injection die 1 and the die wheel 2. As an alternative example, assuming that the yarns Y are to be embedded thickwise centrally in the substrate sheet 4a, they should be introduced centrally into the gap between the injection die 1 and the die wheel 2 by adjusting a non-illustrated guide position before being introduced into the gap. As another alternative example, assuming that the yarns Y are to be embedded in the substrate sheet 4a at a thickwise off-center position toward the hook-element-free surface, i.e. the back surface, they should be introduced along the injection nozzle 1d of the injection die 1 before introducing into the gap.

The thickwise position at which the yarns Y are to be embedded in the substrate sheet 4a considerably depends on the molding resin pressure, the viscosity of molten resin and the cooling rate.

The gap between the lower arcuate surface 1b of the injection die 1 and the die wheel 2, which defines a molding space for molding the substrate sheet 4a, is controlled in size according to the size of the yarns Y to be introduced. Specifically, the gap is controlled in such a manner that the thickness of the yarn-embedded substrate sheet 4a is smaller than 0.3 mm exclusive of the yarn.

For molding the surface fastener of this invention on the foregoing apparatus, molten resin 4 continuously injected from the injection die 1 at a predetermined resin pressure is continuously forced into the gap between the injection die 1 and the die wheel 2 in rotation. At the same time, the yarns Y are introduced into the gap from outside for insertion into the molten resin 4, and hook elements 4b and reinforcing ribs 4c are molded as the hook-element-forming cavities 5 and the reinforcing-rib-forming cavities on the circumferential surface of the die wheel 2 are filled with part of the molten resin 4. Meanwhile a substrate sheet 4a having a predetermined thickness is integrally molded with the hook elements 4b and the reinforcing ribs 4c as yarns Y are embedded in the molten resin part left over at the injection nozzle side of the injection die 1.

Figure 3:
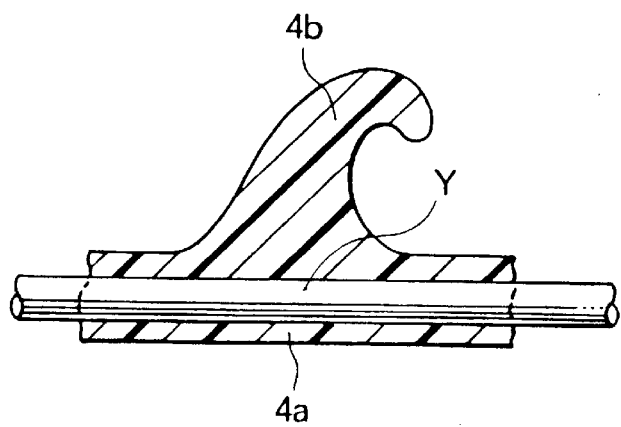
FIG. 3 is a fragmentary enlarged cross-sectional view of a yarn-embedded molded surface fastener manufactured by the method according to the first embodiment.

The molten resin 4 shaped into the form of a surface fastener SF on the circumferential surface of the die wheel 2 together with the yarns Y is moved around substantially a lower half of the circumferential surface of the die wheel 2 as guided by the guide roller 9. During that time, the yarn-embedded substrate sheet 4a, the hook elements 4b and the reinforcing ribs 4c are gradually solidified as the molten resin 4 is cooled partly from the inside of the die wheel 2 and partly in the cooling water tank 10. During this solidification, as the substrate sheet 4a is positively drawn horizontally by the take-up rollers 6, 7, the individual hook elements 4b are resiliently deformed and smoothly removed from the hook-element-forming cavities 5. The hook elements 4b are completely solidified as they restore their original shape immediately after having been removed from the die wheel 2, and as a result, a surface fastener with the individual hook elements 4b as shown in FIG. 3 is molded.

In this embodiment, in order to remove a molded resin product (i.e., a yarn-embedded surface fastener) from the die wheel 2, the vertical pair of take-up rollers 6, 7 rotatable in opposite directions in synchronism with each other are used. Although the circumferential surfaces of the take-up rollers 6, 7 may be smooth, it is preferable that they have grooves for passage of hook-element rows so that the hook elements 4b are kept free from being damaged. The speed of rotation of the take-up rollers 6, 7 is set to be slightly faster than the speed of rotation of the die wheel 2 so that the hook elements 4b can be smoothly removed from the hook-element-forming cavities 5.

In the thus manufactured surface fastener, yarns Y having a predetermined size are each embedded in the substrate sheet 4a between a desired adjacent pair of rows of hook elements 4b straightly along the hook-element rows. The size of the yarns Y and the thickness of the substrate 4a are such that the resin thickness of the substrate sheet 4a exclusive of the yarn Y is smaller than 0.3 mm. If the size of the yarns Y is larger than the set thickness of the substrate sheet 4a, the yarn Y are flattened by a resin pressure applied to the gap between the lower arcuate surface 1b of the injection die 1 and the die wheel 2, and the molten resin flows also to the flattened surfaces to form thin films adhered to the yarns Y, thus the tear strength about 100 g is secured and the shape of surface fasteners during molding and when they are delivered from the factory as well as when they are in use can be stable. If the resin thickness of the substrate sheet 4a exclusive of the yarn Y exceeds 0.3 mm, the tear strength would be over 1000 g so that the substrate sheet 4a can not be torn with ease.

Figure 5:
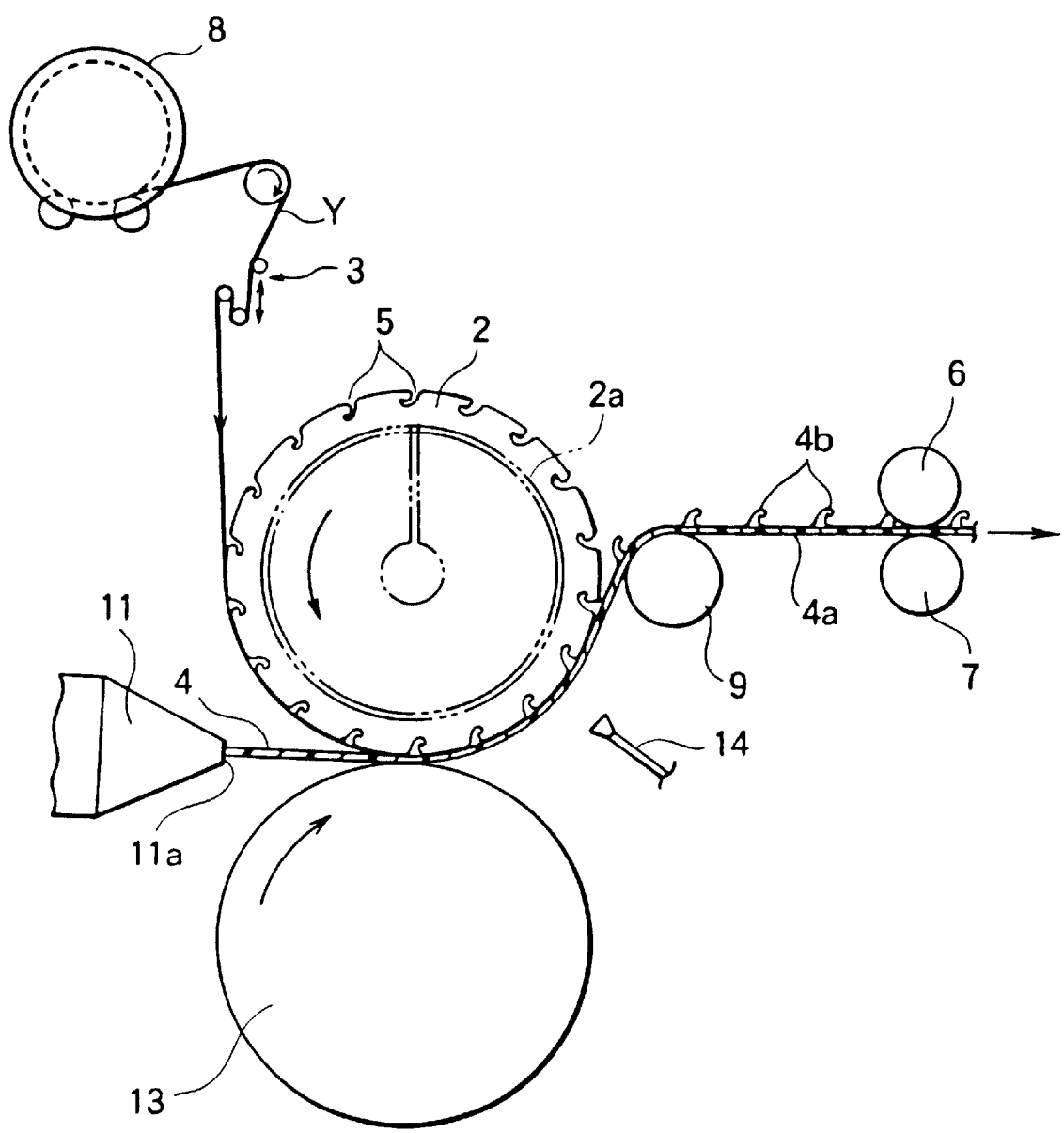
FIG. 5 is a fragmentary vertical cross-sectional view of another apparatus for carrying out another method according to a second embodiment of this invention.

FIG. 5 is a vertical cross-sectional view showing an apparatus for manufacturing a yarn-embedded surface fastener by extrusion molding according to a second embodiment of this invention.

In this embodiment, an extrusion die 11 is used to substitute for the injection die 1 of the foregoing embodiment, and a press roller 13 is disposed under the die wheel 2 with a predetermined gap therebetween. A nozzle 11a of the extrusion die 11 is disposed facing the gap between the die wheel 2 and the press roller 13. These three members are substantially identical in structure with the corresponding members disclosed in U.S. Pat. No. 5,260,015, so their detailed description is omitted here.

As a most significant feature of this embodiment, one or more yarns Y are introduced into the same position as that of the first embodiment between the molten resin 4 extruded from the extrusion die 11 and the die wheel 2. Specifically, in this embodiment, like the first embodiment, yarns Y drawn from one or more bobbins are introduced into the gap between molten resin 4 extruded from the nozzle 11a of the extrusion die 11 and the circumferential surface of the die wheel 2 via a tension regulator 3 after touching part of the circumferential surface of the die wheel 2. In the apparatus of this embodiment, like that of the foregoing embodiment, the gap between the die wheel 2 and the press roller 13 is controlled in such a manner that the resin thickness of the substrate sheet 4a exclusive of the yarn Y is smaller than 0.3 mm.

Inside the die wheel 2, a cooling water jacket 2a for cooling the circumferential surface of the die wheel 2 from inside is mounted. A cooling air blower 14 is disposed facing the circumferential surface of the die wheel 2 which surface has passed the pressure surface against the press roller 13. The die wheel 2 and the press roller 13 are driven by a non-illustrated drive unit to rotate in opposite directions, as indicated by arrows in FIG. 4, in synchronism with each other.

A guide roller 9 is disposed diagonally upwardly on the downstream side of the cooling air blower 14, and a vertical pair of take-up rollers 6, 7 rotatable in opposite direction in timed relation with the rotation of the die wheel 2 is disposed on the downstream side of the guide roller 9.

According to the apparatus of the second embodiment, the molten resin 4 extruded from the extrusion die 11 is introduced into the gap between the yarns Y, which are introduced along the circumferential surface of the die wheel 2 and the press roller 13 to mold hook elements 4b as the hook-element-forming cavities 5 are filled with part of the molten resin under a pressure by the pressing roller 13 and, at the same time, to mold a substrate sheet 4a as the yarns Y are embedded in the substrate sheet 4a. In this embodiment, part of the yarns Y is exposed to the hook-element-molded side surface. The resulting surface fastener SF is moved around substantially a quarter of the circumferential surface of the die wheel 2 and is then continuously removed from the circumferential surface of the die wheel 2 as positively taken by the take-up rollers 6, 7 via the guide roller 9. During that time, the surface fastener SF is gradually cooled by a cooling means 2a inside the die wheel 2 and by the cooling air blower 14 and is thereby solidified. In this embodiment, the yarns Y to be introduced between the die wheel 2 and the press roller 13 are previously heated to eliminate a difference of temperature with the substrate sheet 4a in semimolten state so as to be reliably fused with the substrate sheet 4a.

Using the same apparatus as the second embodiment, when the yarns Y are to be embedded in the substrate sheet 4a at a thickwise off-center position toward the hook-element-free surface, it is possible to introduce the yarns Y into the gap between the press roller 13 and the die wheel 2 as being guided along the surface of the press roller 13.

Figure 4:
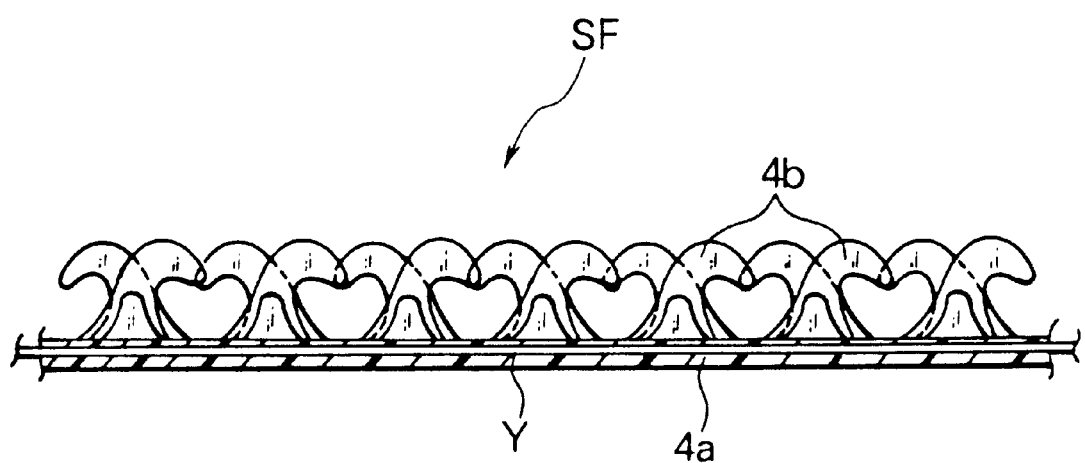
FIG. 4 is a cross-sectional view of a general construction of the yarn-embedded molded surface fastener of this invention.

Also in the second embodiment, as shown in FIG. 4, the individual hook element 4b has a pair of reinforcing ribs 4a on opposite side surfaces; the hook elements 4b in the same row are directed in a common direction, and the hook elements 4b in adjacent rows are directed in opposite directions. Although the reinforcing ribs 4c may be omitted, they are effective to prevent the hook elements 4b from falling flat. Also alternatively, the hook elements 4b in succession in one row may be directed alternately in opposite directions so that a surface fastener having no directivity in engaging strength can be obtained. This invention should by no means be limited to the illustrated example, and various modifications may be suggested without departing from the spirit of this invention.

As is apparent from the foregoing description, according to the method of this invention, partly since a molded type surface fastener in which one or more yarns Y are embedded in a substrate sheet 4a at an engaging-element-free portion between a desired adjacent pair of rows of male engaging elements 4b in a single process can be continuously manufactured simply without requiring plural laborious processes, and partly since the resulting surface fastener can be torn simply along the yarns Y, it is possible to control the width of the surface fastener simply without using a cutter during sewing or attaching, if the position of embedding of the yarn Y with respect to the substrate sheet 4a is preset.

Particularly if the resin thickness of the yarn-embedded part of the substrate sheet 4a exclusive of the yarn Y is smaller than 0.3 mm, it is possible to tear the substrate sheet 4a along the yarn Y while securing a practical durability.

What is claimed is:

1. A method of manufacturing a synthetic resin surface fastener including a unitary molded substrate sheet having a multiplicity of male-engaging elements projecting from a surface thereof, said method comprising the steps of:

providing a rotatably mounted cylindrical die wheel including a curved circumferential surface having a multiplicity of engaging element-forming cavities disposed in rows and an injection die having an arcuate surface having a curvature substantially equal to the curved circumferential surface of the die wheel, said injection die further including an injection nozzle centrally disposed in said arcuate surface and dividing the arcuate surface into an upper arcuate surface portion and a lower arcuate surface portion, said die wheel being positioned for rotation such that its circumferential surface is received against the arcuate surface, the lower arcuate surface portion being configured so that a predetermined gap is defined between the lower arcuate surface portion and the curved circumferential surface of the die wheel;

rotating the die wheel;

continuously injection molding molten resin through the injection nozzle against the curved circumferential surface and into the gap;

continuously introducing a plurality of yarns between the circumferential surface of the die wheel and the upper arcuate surface portion of the injection die so that each yarn is introduced between desired adjacent pairs of rows of said engaging element-forming cavities;

integrally molding said yarns and substrate sheet and male-engaging elements on the circumferential surface;

positively cooling the circumferential surface; and continuously removing molded and cooled surface fastener thus formed from the circumferential surface, said predetermined gap being selected so that a thickness dimension of said substrate sheet intermediate adjacent rows of male-engaging elements having embedded yarn therein is less than about 0.3 mm exclusive of said yarn.

2. A method as defined in claim 1, wherein the molded and cooled surface fastener is rolled on a take up roller.

3. A method as defined in claim 2, wherein the take up roller is rotated in synchronism with the rotation of the die wheel.

4. A method as defined in claim 2, wherein the take up roller is rotated slightly faster than the speed of rotation of the die wheel.

5. A method as defined in claim 1, wherein the yarns are selected from the group consisting of: natural fiber yarns, animal fiber yarns, mineral fiber yams, semi-synthetic fiber yarns and synthetic fiber yarns.

6. A method as defined in claim 1, wherein the molten resin is selected from the group consisting of: polyamide resin, polyester resin, polypropylene resin and polyethylene resin.

* * * * *